United States Patent
DeLong et al.

(10) Patent No.: US 10,745,064 B2
(45) Date of Patent: Aug. 18, 2020

(54) CARGO BOX STORAGE CADDY WITH REMOVABLE CONTAINERS

(71) Applicant: RUGGED LINER, INC., Ann Arbor, MI (US)

(72) Inventors: Ryan DeLong, Stockbridge, MI (US); Jerome Facchinello, Grand Blanc, MI (US); Chad Carter, Manchester, MI (US); Daniel J. Delaney, Pinckney, MI (US); Derrick Fair, Whitmore Lake, MI (US)

(73) Assignee: RUGGED LINER, INC., Ann Arbor, MI (US)

( * ) Notice: Subject to any disclaimer, the term of this patent is extended or adjusted under 35 U.S.C. 154(b) by 0 days.

(21) Appl. No.: 16/161,457

(22) Filed: Oct. 16, 2018

(65) Prior Publication Data

US 2020/0114980 A1 Apr. 16, 2020

(51) Int. Cl.
*B60R 9/06* (2006.01)
*B62D 33/02* (2006.01)

(52) U.S. Cl.
CPC ............ *B62D 33/0207* (2013.01); *B60R 9/06* (2013.01)

(58) Field of Classification Search
CPC ........ B60R 9/06; B60R 9/065; B62D 33/0207
USPC ................................. 224/402–404; 296/37.6
See application file for complete search history.

(56) References Cited

U.S. PATENT DOCUMENTS

| | | | | |
|---|---|---|---|---|
| 4,728,017 A | * | 3/1988 | Mullican | .................... B60R 9/00 224/328 |
| 5,094,375 A | * | 3/1992 | Wright | ...................... B60R 7/02 224/404 |
| 5,588,631 A | | 12/1996 | Yee | |
| 5,884,957 A | * | 3/1999 | Shoen | ........................ G07F 9/10 296/37.1 |
| 5,893,599 A | | 4/1999 | Strohfeldt | |
| 5,924,615 A | | 7/1999 | McGarrah | |
| 6,234,559 B1 | | 5/2001 | Block et al. | |
| 6,325,439 B1 | | 12/2001 | Crossman | |
| 6,729,514 B1 | | 5/2004 | Delgado | |
| 6,827,385 B2 | | 12/2004 | Mobley | |
| 8,567,650 B2 | * | 10/2013 | Read | ....................... B60R 9/065 224/404 |
| 8,764,088 B1 | * | 7/2014 | Jobe | ........................ B65G 69/30 14/69.5 |
| 9,650,085 B2 | | 5/2017 | Wilson | |
| 2006/0244279 A1 | | 11/2006 | Ranka et al. | |
| 2006/0279099 A1 | | 12/2006 | Ranka et al. | |
| 2016/0009232 A1 | * | 1/2016 | Budny | ..................... B60R 11/06 206/373 |

(Continued)

OTHER PUBLICATIONS

BAKBOX2 Tonneay Tool Box, available at https://www.realtruck.com/bakbox-2-tonneau-tool-box/, last accessed on Jul. 2, 2018.

*Primary Examiner* — Scott T McNurlen

(74) *Attorney, Agent, or Firm* — The Dobrusin Law Firm, P.C.

(57) ABSTRACT

A storage caddy comprising: (a) a frame assembly; (b) a mounting assembly connected to the frame assembly, the mounting assembly being configured to attach the storage caddy to one or more walls of a cargo box of a vehicle; (c) one or more anchors connected to the frame assembly; and (d) one or more tie-downs extending from the one or more anchors and being configured to connect to one of the one or more walls, a floor, or both of the cargo box.

16 Claims, 3 Drawing Sheets

(56) References Cited

U.S. PATENT DOCUMENTS

2018/0147970 A1\* 5/2018 Lasley .................. B63C 13/00

\* cited by examiner

US 10,745,064 B2

CARGO BOX STORAGE CADDY WITH REMOVABLE CONTAINERS

FIELD

The present teachings relate to a storage caddy system and more specifically, a storage caddy system that is mounted to a wall of a cargo box of a vehicle such as a pickup truck.

BACKGROUND

Generally, vehicles with a cargo box are used to move large items; however, people have begun covering the cargo boxes to use the cargo boxes to store items. Items stored within the cargo box are susceptible to movement within the cargo box as the vehicle is in transit. Various storage containers have been developed in an attempt to maintain organization of the items and prevent the items from moving around during transit.

In some instances, storage systems rest on the cargo box floor. Use of these types of storage systems precludes large cargo, such as drywall or plywood, from extending over the full area of the cargo box. Other storage systems are mounted so that a portion of the storage system rests on a top surface of the cargo box walls. In some instances, storage systems are mounted along a cargo box sidewall. Use of these types of storage systems precludes equal access to the storage container from either side of the cargo box.

Examples of cargo box storage systems may be found in U.S. Pat. Nos. 6,729,514; 5,924,615; 5,893,599; 5,588,631; and U.S. Patent Application No. 2006/0279099 A1 and 2006/0244279 A1 the teachings of which are incorporated by reference herein for all purposes. It would be desirable to have a storage system configured to mount to the forward cargo box wall, below the plane defined by the top surface of the cargo box walls, or both. It would be desirable if the storage system suspended the cargo above the cargo box floor. What is needed is a storage system that can adjust to accommodate variations in spacing between the storage system and the cargo box wall. It would be desirable to have a storage system that includes one or more tie downs that act as a sway brace.

SUMMARY

The present teachings seek to help solve one or more of the problems/issues disclosed above. The present teachings are particularly directed to a storage caddy system that is mounted to a wall of a cargo box of a vehicle such as a pickup truck.

Accordingly, pursuant to one aspect of the present teachings provide: a storage caddy comprising: (a) a frame assembly; (b) a mounting assembly connected to the frame assembly, the mounting assembly being configured to attach the storage caddy to one or more walls of a cargo box of a vehicle; (c) one or more anchors connected to the frame assembly; and (d) one or more tie-downs extending from the one or more anchors and being configured to connect to one of the one or more walls, a floor, or both of the cargo box.

The present teachings provide a storage caddy system that may be attached to the forward wall of a cargo box. The present teachings provide a storage caddy system that may be attached to a wall of a cargo box without preventing the attachment of a tonneau cover. The present teachings provide a storage caddy system with containers that may be removed from the storage caddy.

BRIEF DESCRIPTION

DETAILED DESCRIPTION

Figure 1A:
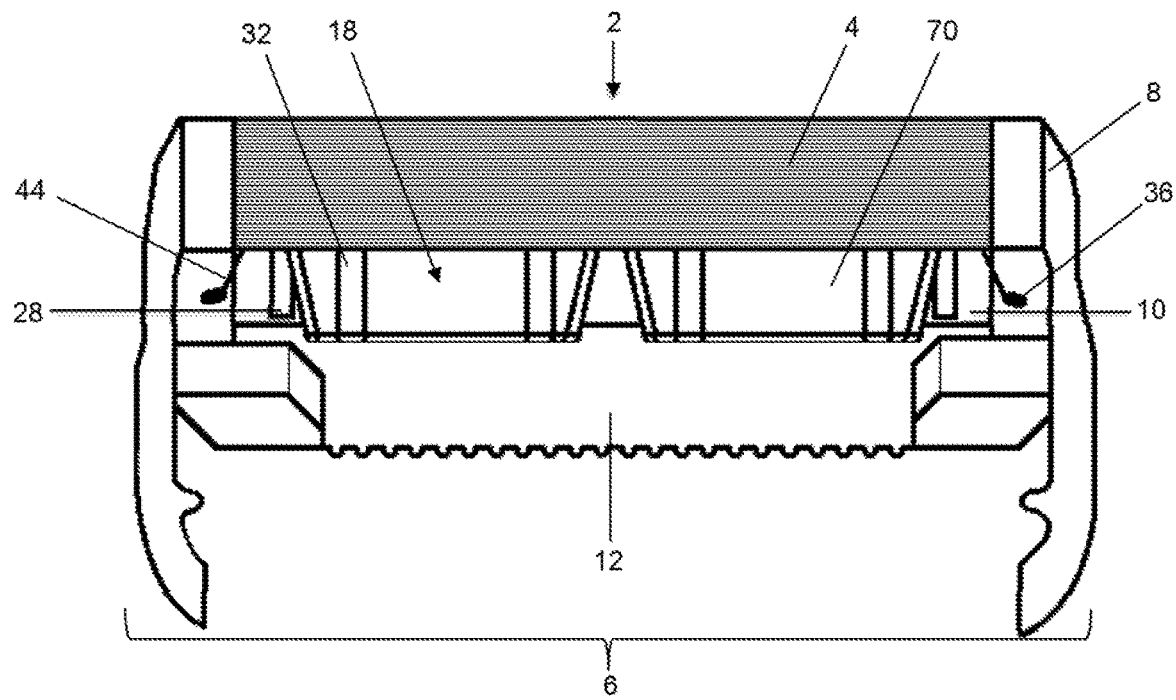
FIG. 1A is a perspective view of a storage caddy that is mounted to a wall of a cargo box with a tonneau cover being closed over the storage caddy.

The explanations and illustrations presented herein are intended to acquaint others skilled in the art with the teachings, principles, and practical applications of the teachings herein. Those skilled in the art may adapt and apply the teachings in its numerous forms, as may be best suited to the requirements of a particular use. Accordingly, the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a storage caddy system for a vehicle. The vehicle may be any vehicle configured to transport cargo, articles, or both. The vehicle may be any vehicle with a cargo box. The vehicle may be a pickup truck, a flatbed truck, a tow truck, a box truck, a cargo van, a utility vehicle, or a combination thereof. Preferably, the vehicle includes a cargo box.

The cargo box may function to provide a boundary for cargo containment while in transit. The cargo box may include one or more vertical walls. Preferably, the cargo box includes four vertical walls that bound an area encircled by the vertical walls. For example, the cargo box may include a forward wall, two sidewalls, a cargo box floor, a tailgate, a vehicle's passenger cabin, or any combination thereof. The cargo box floor may be a wall that establishes the lowest elevation of the cargo box. The cargo box may be made of metal, metal alloy, polymer, fiberglass, a matrix of material, or any combination thereof. The cargo box may include a protective liner to guard against wear and environmental degradation (e.g., corrosion, rust, tarnish).

The forward wall may function to provide a surface from which a storage caddy may be mounted. The forward wall may be a vertical wall located at the end of the cargo box nearest the front of the vehicle. The forward wall may be a wall that is separate from, but runs parallel to, the vehicle's passenger cabin. The forward wall may be the rear wall of the vehicle's passenger cabin. The forward wall may form a connection with one or more sidewalls, a floor, a tonneau cover, a storage caddy, or any combination thereof. A connection formed between the storage caddy and the forward wall may function to support a load carried by the storage caddy. The forward wall may contain a plurality of through holes used to form a connection with a storage caddy. The plurality of through holes, used to form a connection between the forward wall and the storage caddy, may be preformed, bored, punched, cut, or a combination thereof. The forward wall may contain a plurality of catches used to form an indirect connection with a storage caddy using a tie-down. The forward wall may be located opposite the tailgate.

The tailgate may function to enclose the cargo box. The tailgate may be a vertical wall located opposite the vehicle's passenger cabin. The tailgate may support or connect with the storage caddy. The tailgate may be movable. The tailgate may form a connection with one or more sidewalls, a floor, a tonneau cover, or any combination thereof.

The one or more sidewalls may function to enclose the cargo box. The sidewalls may include one or more vertical walls located adjacent to the forward wall. The sidewalls may form a connection with a forward wall, a cargo box floor, a vehicle's passenger cabin, a tailgate, a storage caddy, or any combination thereof. The storage caddy may be directly connected to the sidewalls, indirectly connected to the sidewalls, or a combination thereof. The sidewalls may contain a plurality of through holes or one or more catches used to form a indirect or direct connection with a storage caddy. For example, an indirect connection may be formed between the one or more sidewalls and a storage caddy by securing one end of a tie-down to a catch while a second end of the tie-down is secured to an anchor located on the storage caddy. Preferably, the storage caddy is free of a direct connection to the sidewalls.

A connection formed between the storage caddy and the one or more sidewalls may function to prevent rotational movement, lateral movement, movement away from the wall, or a combination thereof. For example, a connection formed between the storage caddy and the one or more sidewalls may prevent swaying of the storage caddy when a vehicle starts, stops, hits bumps, turns corners, or a combination thereof. A connection formed between the storage caddy and the sidewalls may be used to support a load placed on the storage caddy. The sidewalls may be configured to enable the attachment of a tonneau cover.

The tonneau cover may function to provide security by protecting the storage caddy against theft, vandalism, environmental elements, or a combination thereof. The tonneau cover may function to enclose a cargo box by attaching the cover to the top surface of the sidewalls, a vehicle's passenger cabin, a forward wall, a tailgate, or any combination thereof. Preferably, the mounting of the storage caddy will not affect the performance of the tonneau cover. The tonneau cover may be constructed using any suitable materials. Suitable materials may include metal (e.g., iron, aluminum), metal alloy (e.g., steel, titanium alloy), polymer (e.g., thermoplastics, plastics), wood, fiberglass, cloth, or a combination thereof. The tonneau cover may be extendable, retractable, foldable, rollable, or a combination thereof. The tonneau cover may be configured to form a sealed connection with the storage caddy.

The storage caddy may function to contain cargo or articles within the cargo box so that the cargo or articles are prevented from freely moving within the cargo box. The storage caddy may suspend cargo from one or more of the cargo box walls. Suspending cargo from one or more of the cargo box walls, above the plane defined by the cargo box floor, may increase the usable area of the cargo box. For example, suspending the cargo above the elevation where it is free from contact with the cargo box floor may allow large cargo, such as drywall or plywood, to extend over the full area of the cargo box without having to remove the storage caddy. The storage caddy may be positioned at or below the plane defined by the top surface of the sidewalls. Positioning the storage caddy at or below the plane defined by the top surface of the sidewalls may prevent the storage caddy from interfering with the attachment of a tonneau system, a view of a drive out a rear window, or both. The tonneau system may extend above the storage caddy. The storage caddy may be permanently or removably attached to one or more sidewalls, a forward wall, a tailgate, a floor, a vehicle's passenger cabin, or any combination thereof. Preferably, the storage caddy is removably attached to a wall of the cargo box. The storage caddy may be attached to the cargo box using fasteners, adhesives, a metal-joining technique, or a combination thereof. The fasteners may be screws, bolts, nuts, nails, press-fit clips/buttons, hooks, latches, studs, or any combination thereof. The fasteners may each extend through one of the plurality of through holes in the forward wall. The adhesives may be glue, epoxy, polyurethane, cyanoacrylate, or a combination thereof. The metal-joining technique may be welding, soldering, brazing, or a combination thereof. The storage caddy may include a mounting assembly, a frame assembly, one or more tie-downs, one or more anchors, one or more catches, one or more containers, or a combination thereof.

The frame assembly may function to provide stability and support to the storage caddy, one or more containers, one or more articles, or a combination thereof. The frame assembly may include one or more frame members, one or more support brackets, one or more support straps, or a combination thereof. The frame assembly may connect to a wall of the cargo box and have a portion that extends cantilevered from the wall of the cargo box to support one or more containers, one or more articles, or a combination thereof. The frame assembly may be permanently or removably secured to a forward wall, one or more sidewalls, a cargo box floor, a tailgate, a vehicle's passenger cabin, or any combination thereof. Preferably, the frame assembly is removably attached to a wall of the cargo box. The components of the frame assembly may be connected together to support one or more containers, one or more articles, or both in an elevated position. A connection formed with either the frame assembly or a frame assembly component may be achieved using fasteners, adhesives, a metal-joining technique, or a combination thereof. The fasteners may be screws, bolts, nuts, nails, press-fit clips/buttons, studs, hooks, latches, or a combination thereof. The adhesives may be glue, epoxy, polyurethane, cyanoacrylate, or a combination thereof. The metal-joining technique may be welding, soldering, brazing, or a combination thereof. Alternatively, a connection formed with either the frame assembly or a frame assembly component may be integrally formed. For example, a connection between frame assembly components may be performed by casting or extruding the components as one unitary piece. A connection formed with the frame assembly may be movable. A movable connection may be accomplished using one or more hinges, sliders, or a combination thereof. For example, the use of hinged connections between the support brackets and the lateral frame members would allow the support brackets to fold up against the bottom surface of the lateral frame members. After the support brackets have been collapsed, hinged connections between the longitudinal frame member and the forward wall enables the cantilevered portion of the frame assembly to fold into a stored position against the forward wall.

The frame assembly may be constructed of a material that is sufficiently rigid to allow the frame assembly to support one or more containers, articles, or both in an elevated position. The frame assembly may be constructed of metal (e.g., iron, aluminum), metal alloy (e.g., steel, titanium alloy), polymer (e.g., thermoplastics, plastics), wood, fiberglass, cloth, or any combination thereof. The frame assembly may have a protective coating to guard against environmental degradation (e.g., corrosion, rust, tarnish). The one or more frame members may include one or more longitudinal frame member, one or more lateral frame members, one or more cross members, one or more vertical frame members, or a combination thereof. The frame members may be hollow, solid, or a combination thereof. The frame members may be open at each end, closed, capped, or a combination thereof.

The one or more longitudinal frame members may function to create a portion of a peripheral frame for the storage caddy. The longitudinal frame members may include a frame member positioned substantially parallel with the vehicle's rear cabin wall. The longitudinal frame members may be permanently or removably connected to one or more lateral frame members, one or more cross members, one or more vertical frame members, one or more support brackets, one or more containers, one or more support straps, one or more mounting brackets, one or more walls of the cargo box, or a combination thereof. The longitudinal frame members may vary in length and width depending on the shape and size desired. For example, the longitudinal frame members may span across the width of the cargo box or any distance in between. Preferably, the longitudinal frame members extend from one lateral frame member to a second lateral frame member. The longitudinal frame members may include one or more holes. The one or more holes may receive a fastener to connect a longitudinal frame member to a lateral frame member. For example, a detent located on the end of lateral frame member may form a connection when the detent is received by a hole in the longitudinal frame member. The longitudinal frame members may provide support to the one or more cargo containers. For example, the top surface of the longitudinal frame members may form a hold on which the cargo container flange may rest. The longitudinal frame members may include one or more support members for additional stiffness. For example, the longitudinal frame members may include one or more legs that extend to the cargo box floor to substantially eliminate flex near the midpoint of the longitudinal frame members. The longitudinal frame members may be configured to attach to one or more cross members, one or more lateral frame members, or both.

The one or more lateral frame members may function to create a portion of a peripheral frame for the storage caddy. The lateral frame members may include a frame member positioned substantially parallel to the cargo box sidewalls. The lateral frame members may be permanently or removably connected to one or more longitudinal frame members, one or more cross members, one or more vertical frame members, one or more support brackets, one or more containers, one or more support straps, one or more mounting brackets, one or more walls of the cargo box, or a combination thereof. The lateral frame members may be substantially perpendicular with respect to the longitudinal frame members, the vertical frame members, or a combination thereof. The lateral frame members may vary in length and width depending on the shape and size desired. For example, the lateral frame members may span between a pair of longitudinal frame members. Preferably, the lateral frame members connect to an end region or an end of a longitudinal frame member. The length of the lateral frame members may be adjustable.

The lateral frame members may have a shape substantially similar or dissimilar to the cross members, the longitudinal frame members, the vertical frame members, or a combination thereof. The lateral frame members may include one or more detents. The one or more detents may form a connection with a longitudinal frame member. For example, a detent located on the end of lateral frame member may form a connection when the detent is received by a hole in the longitudinal frame member. The lateral frame members may provide support to the one or more cargo containers. For example, the top surface of the lateral frame members may form a hold on which the cargo container flange may rest. The lateral frame members may include one or more support members for additional stiffness. For example, the lateral frame members may include one or more legs that extend to the cargo box floor to support a load placed on the storage caddy. The lateral frame members may be configured to attach to one or more cross members, one or more lateral frame members, or both.

The one or more cross members may function to provide structural support for the storage caddy. The cross members may function to prevent lateral bowing of the longitudinal frame members and to divide the length. The cross members may be permanently or removably connected to one or more lateral frame members, one or more longitudinal frame members, one or more cross members, one or more containers, one or more support straps, or a combination thereof. A connection formed with the cross members may be movable. A movable connection may be accomplished using one or more hinges, sliders, or any combination thereof. For example, a slider may allow the position of the cross member to be adjusted while situated between two longitudinal frame members. The cross members may include one or more holes which may be used when forming a connection. For example, a detent located on the end of a frame member may form a connection when the detent is received by a hole in the cross member.

The cross members may vary in length and width depending on the shape and size desired. For example, the cross members may span between a pair of longitudinal frame members. The length of the cross members may be adjustable. The cross members may have a shape substantially similar or dissimilar to the lateral frame members, the longitudinal frame members, or the vertical frame members. The cross members may function to support and prevent longitudinal movement of a container or article. For example, the top surface of the cross members may form a hold on which the cargo container flange may rest. The cross members may include one or more support members for additional stiffness. For example, the cross members may include one or more legs that extend to the cargo box floor to support a load placed on the storage caddy. The one or more cross members may be stabilized by one or more support brackets.

The one or more support brackets may function to provide structural support for the storage caddy. The support brackets may prevent relative movement of the vertical frame members and the lateral frame members. The support bracket may extend between and connect the lateral frame member to the vertical frame member. The shape and size of the support brackets may vary as desired. For example, the thickness of the support bracket may be increased for added stability. The support brackets may be triangular, rectangular, or any other shape capable of providing support to the one or more lateral frame members, cross members, longitudinal frame members, or a combination thereof. The support bracket may include one or more anchors for attaching a tie-down. The support brackets may be permanently or removably connected to one or more longitudinal frame members, one or more vertical frame members, one or more lateral frame members, or a combination thereof. Alternatively, a connection with the support brackets may be integrally formed. The support brackets may be connected to one or more vertical frame members.

The one or more vertical frame members may function to brace the cargo storage system against a wall of the cargo box. The vertical frame members may prevent rotational movement of the frame assembly relative to the forward wall. The vertical frame members may be permanently or removably connected to one or more of the cargo box walls, a component of the frame assembly, one or more mounting brackets, or a combination thereof. The vertical frame members may vary in length, width, or both. For example, the vertical frame members may extend telescopically to compensate for variations in distance between the longitudinal frame members and the cargo box floor. The vertical frame members may have a shape substantially similar or dissimilar to the cross members, the longitudinal frame members, the lateral frame members, or a combination thereof. The vertical frame members may be positioned substantially parallel to the forward cargo box wall. The frame assembly may be attached to the cargo box by the mounting assembly.

The mounting assembly functions to secure the storage caddy to the cargo box or to the vehicle's passenger cabin, prevent rotational movement of the frame assembly, level the frame assembly, or a combination thereof. The mounting assembly may consist of one or more mounting brackets, leveling feet, tie-downs, anchors, catches, or any combination thereof. The mounting assembly may connect the frame assembly to a wall of the vehicle and level the frame assembly relative to the wall of the vehicle. The mounting assembly may form a removable or permanent connection with the frame assembly, the cargo box, the vehicle's passenger cabin, or a combination thereof. A connection formed with a mounting assembly may be accomplished using any of the joining techniques discussed herein for the frame assembly.

The one or more mounting brackets function to attach the storage caddy to the cargo box or to the vehicle's passenger cabin. The mounting brackets may be permanently or removably connected to one or more longitudinal frame members, one or more lateral frame members, or a combination thereof. The mounting brackets may permanently or removably connect the storage caddy to one or more of the cargo box sidewalls, the forward cargo box wall, the vehicle cabin, or any combination thereof. The mounting brackets may include one or more holes which may be used when forming a connection. The mounting brackets may include a keyhole bore to facilitate easy attachment and removal. A connection formed with the mounting brackets may be movable. A movable connection may be accomplished using one or more hinges or sliders, or any combination thereof. Alternatively, the mounting brackets may be integrally formed with one or more longitudinal frame members, one or more lateral frame members, or a combination thereof. The mounting bracket connection may be stabilized using a leveling foot.

The one or more leveling feet may function to stabilize the connection between the storage caddy and the cargo box or to the vehicle's cabin. The leveling foot may be permanently or removably connected to the vertical frame members. The one or more leveling feet may form a cantilevered connection with the frame assembly. The leveling foot may be adjustable. The adjustability may be a result of threading the connection point between the leveling foot and the vertical frame member. The adjustability of the leveling foot may function to increase and/or decrease the spacing between the vertical frame member and the receiving cargo box wall. Adjusting the spacing between the vertical frame member and the receiving cargo box wall may be used to level the frame assembly and to account for fluctuations in the receiving cargo box wall. The receiving cargo box wall may be the cargo box sidewalls, the forward cargo box wall, the vehicle's cabin, or a combination thereof. A leveling foot may consist of a rod, a bumper, a connector, or a combination thereof.

The rod may function to brace the vertical frame member. The rod may vary in length and/or width depending on the shape and/or size desired. The rod may span between a vertical frame member and a cargo box sidewall, a forward cargo box wall, the vehicle's cabin, or a combination thereof. The rod may be permanently or removably connected to one or more vertical frame members, a bumper, a cargo box wall, or a combination thereof. A connection formed with the rod may be movable. A movable connection may be accomplished by threading the connection point. Threading the connection point between the rod and the bumper and/or the rod and the vertical frame member may increase adjustability. The rod may include a ball-and-socket joint so that the bumper can compensate for unevenness on the surface of a wall contacting the bumper. Alternatively, the rod may be integrally formed with a vertical frame member, a bumper, or a combination thereof.

The bumper may function to stabilize the storage caddy. The shape and size of the bumper may vary as desired. The bumper may form a permanent or removable connection with the rod, a cargo box wall, the vehicle's cabin, or any combination thereof. A connection formed with the bumper may be movable. A movable connection may be accomplished by threading the connection point. For example, a threaded bumper may be screwed onto the rod to decrease the length of the exposed portion of the rod. Alternatively, the bumper may be integrally formed with the rod. The stability of the storage caddy may be further increased by one or more tie-downs.

The one or more tie-downs may function to stabilize the storage caddy. The tie-downs may be made of a polymer, plastic, metal, spring steel, rubber, elastomer, a reinforced material, Kevlar, or a combination thereof. The tie-downs may be constructed using one or more elastic bands such as rubber bands or a spring that elastically deform when the storage caddy is moved. The tie-downs may be adjustable in length. For example, the tie-downs may ratchet or tighten to increase the rigidity of the storage caddy. The tie-downs may have a hook on each end for attachment. The tie-downs may form a permanent or removable connection with a support bracket, longitudinal frame member, lateral frame member, the cargo box, or any combination thereof. A connection formed with a tie-down may be facilitated using one or more anchors, holes, bores, catches, or any combination thereof. A tie-down may be used to assist in suspending the frame assembly from the cargo box. For example, a suspension tie-down may extend from the forward cargo box wall downwards to one or more longitudinal or lateral frame members.

The one or more catches function to provide an attachment point for the tie-downs. The catches may be a hook, loop, ring, hole, a bore, or any other structure capable of forming a connection with the tie down. The catches may permanently or removably connect the tie-down with the cargo box. A catch may be constructed using any suitable materials.

The one or more anchors function to provide an attachment point for the tie-downs. The anchor may be a hook, loop, ring, hole, clip, or any other structure capable of forming a connection with the tie down. The anchor may be permanently or removably connected to a support bracket, longitudinal frame member, lateral frame member, or any combination thereof. The anchor may be constructed using any suitable materials. The anchor may be located near the one or more storage containers.

The one or more containers functions to secure the cargo stored within the storage caddy. The containers may be permanently or removably connected to the frame assembly. The containers may have a flange that catches on the frame assembly. The containers may be constructed using any suitable materials. Suitable materials may include metal (i.e., iron, copper, aluminum), metal alloy (i.e., brass, steel, titanium), polymer (i.e., thermoplastics, plastics), wood, fiberglass, minerals, or any combination thereof. The containers may be a cargo net, a wire basket, or a bin. The containers may be dent and/or puncture resistant. The containers may be translucent or opaque. The containers may be sufficiently sized to contain various sized cargo. The containers may have a lid. The lid may be lockable. The lid may function to protect the cargo from exposure to environmental elements. The containers may be insulated. For example, the containers may be insulated and used for food storage during road trips. It may be desirable for the containers to have an aperture in the bottom. For example, if the containers are not equipped with lids, the aperture can function as a drain to prevent the accumulation of rainwater. The containers may have a pair of handles. The containers may be any height. For example, the containers may extend from the top of the frame assembly down to the floor of the cargo box, or any position therein. The containers may function to protect the cargo that is placed within the storage caddy. For example, while the vehicle is in use, delicate cargo may be placed within the storage caddy to provide protection against cargo that is loosely placed in the cargo box. The containers may be supported by one or more support straps. The containers may have a channel to prevent the support strap from moving.

The one or more support straps function to support the containers. The support straps may be a preformed shape. The support straps may be adjustable. The support straps may be constructed using any suitable materials. Suitable materials may include metal (i.e., iron, copper, aluminum), metal alloy (i.e., brass, steel, titanium), polymer (i.e., thermoplastics, plastics), cloth, or any combination thereof. The support straps may be wire. The support straps and the tie downs may be made of the same material. The support straps may form a connection with one or more longitudinal frame members, one or more cross members, one or more lateral frame member, or any combination thereof. One end of a support strap may connect to a first longitudinal frame member and a second end of a support strap may connect to a second longitudinal frame member. The support strap may be flexible, may hang downward from the longitudinal frame members, or both. The support strap may be shaped to mirror a shape of a container. The support straps may hang from the frame assembly and form a complementary fit with a container when a container is inserted into the frame assembly and support straps. A connection formed with the support strap may be accomplished using fasteners, adhesives, metal-joining techniques, or a combination thereof. The fasteners may be screws, bolts, nuts, nails, press-fit clips/buttons, hooks, latches, or a combination thereof. The adhesives may be glue, epoxy, polyurethane, cyanoacrylate, or a combination thereof. The metal-joining technique may be welding, soldering, brazing, or a combination thereof.

Turning now to the figures, FIG. 1A illustrates a perspective view of a vehicle 2 having a storage caddy 18. The vehicle 2 includes a cargo box 6 consisting of a forward wall 10, two sidewalls 8, a cargo box floor 12, and optionally a rear wall or tailgate (not shown). The sidewalls 8 are symmetrically opposite to each other. The cargo box 6 includes a tonneau cover 4 that is shown in the closed position and extends over a storage caddy 18, which can be locked within the cargo box 6 by the tonneau cover 4. The storage caddy 18 includes a frame assembly 20. The storage caddy 18 forms a connection with the forward cargo box wall 10 via the frame assembly 20. The frame assembly 20 includes a pair of vertical frame members 28 that stabilize the connection between the forward wall 10 and the storage caddy 18. The storage caddy 18 is further secured to the cargo box 6 by a pair of tie-downs 44 that are connected to a catch 42 in the sidewalls 8. Containers 70 are removably located within the storage caddy 18 and are supported by a plurality of support straps 32. The support straps 32 assist in suspending the containers 70 above the cargo box floor 12.

Figure 1B:
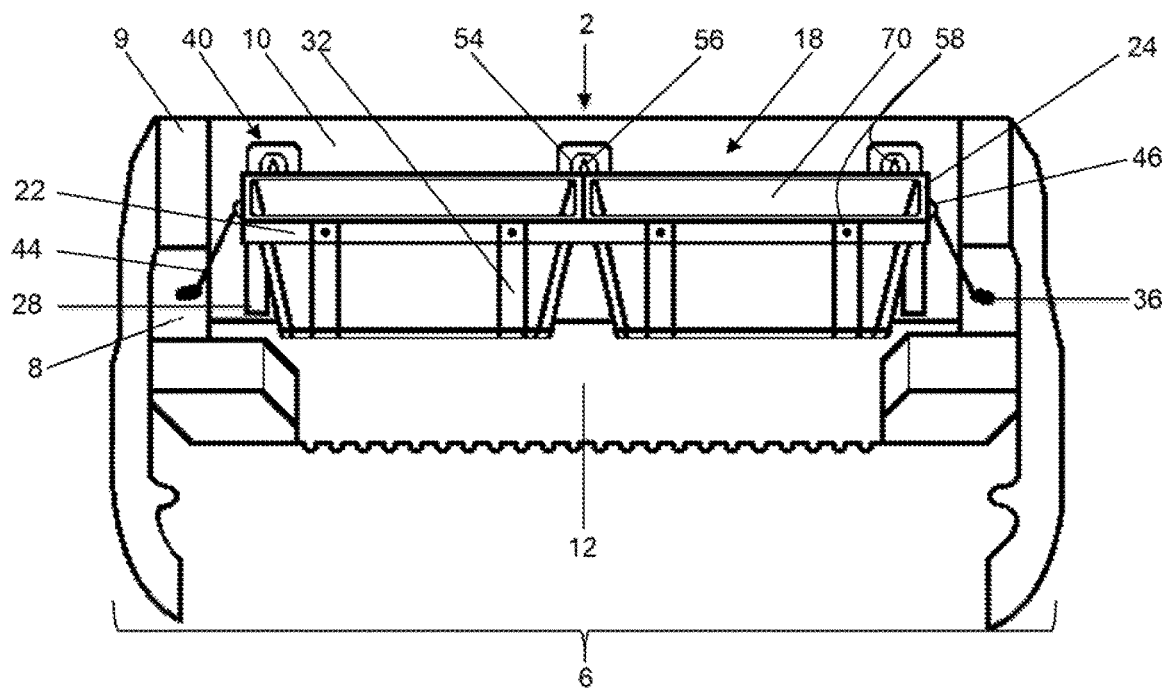
FIG. 1B is a perspective view of a storage caddy that is mounted to a wall of a cargo box.

FIG. 1B illustrates a perspective view of a vehicle 2 having a storage caddy 18 with a cargo box 6 of the vehicle 2 being uncovered. The cargo box 6 consists of a forward wall 10, two sidewalls 8, and a cargo box floor 12. The storage caddy 18 is affixed to the forward cargo box wall 10 by a mounting assembly 40 that is located below the plane defined by the sidewall's top surface 9. The connection is aided by a plurality of mounting brackets 54. The mounting brackets 54 include a hole 56 which allows a fastener 58 to lock the storage caddy 18 into position. The stability of the storage caddy 18 is enhanced by a pair of vertical frame members 28 and a pair of tie-downs 44. The tie-downs 44 secure the storage caddy 18 to the sidewalls 8 by connecting the storage caddy 18 from an anchor 46 on the side of the lateral frame member 24 to a catch 42 in the sidewall 8. The containers 70 which are supported by a plurality of support straps 32 connected to and extending from the longitudinal frame members 22 by a fastener 58 so that the support straps 32 suspend the containers 70 above the cargo box floor 12.

Figure 2:
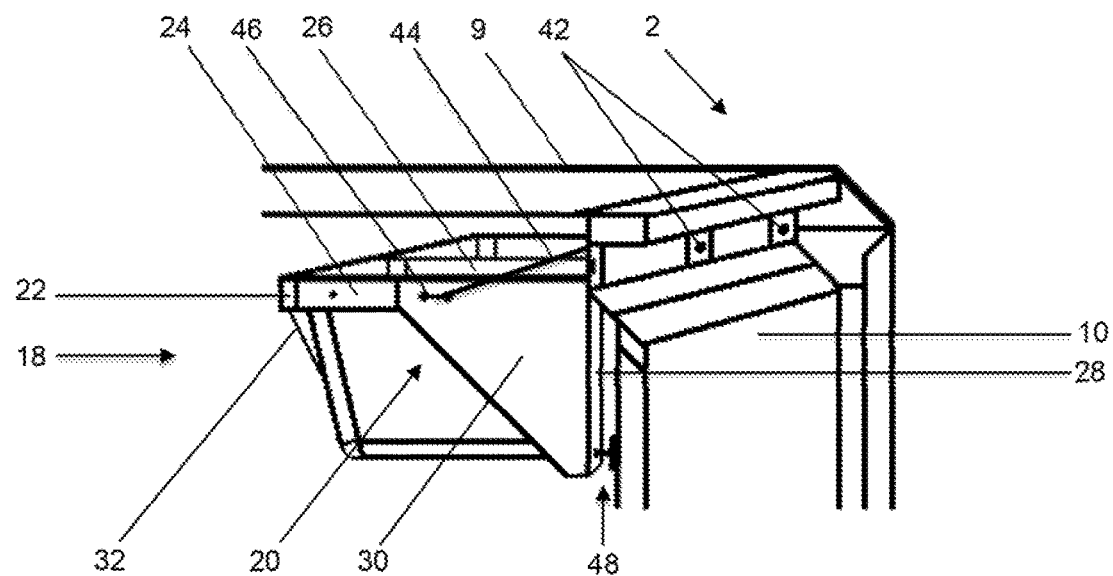
FIG. 2 is a side view of a storage caddy that is mounted to a cargo box.

FIG. 2 illustrates a side view of a storage caddy 18 connected to a forward wall 10 of a vehicle 2. The storage caddy 18 includes a frame assembly 20 that is comprised of a pair of vertical frame members 28, a pair of longitudinal frame members 22, a pair of lateral frame members 24, a pair of support brackets 30, a plurality of support straps 32, and a cross member 26. The frame assembly 20 is secured to the forward cargo box wall 10 using a plurality of through holes 42 made in the forward cargo box wall 10. The storage caddy 18 is mounted below the plane defined by the sidewall's top surface 9. A tie-down 44 is used to assist in suspending the storage caddy 18 from the forward cargo box wall 10. A leveling foot 48 extends from the vertical frame member 28 to adjustably compensate for variations in spacing between the storage caddy 18 and the forward cargo box wall 10. A support bracket 30 reinforces the lateral frame members 24 by forming a connection between the lateral frame members 24 and the vertical frame members 28. The support bracket 30 is equipped with an anchor 46 for the attachment of a tie-down 44.

Figure 3:
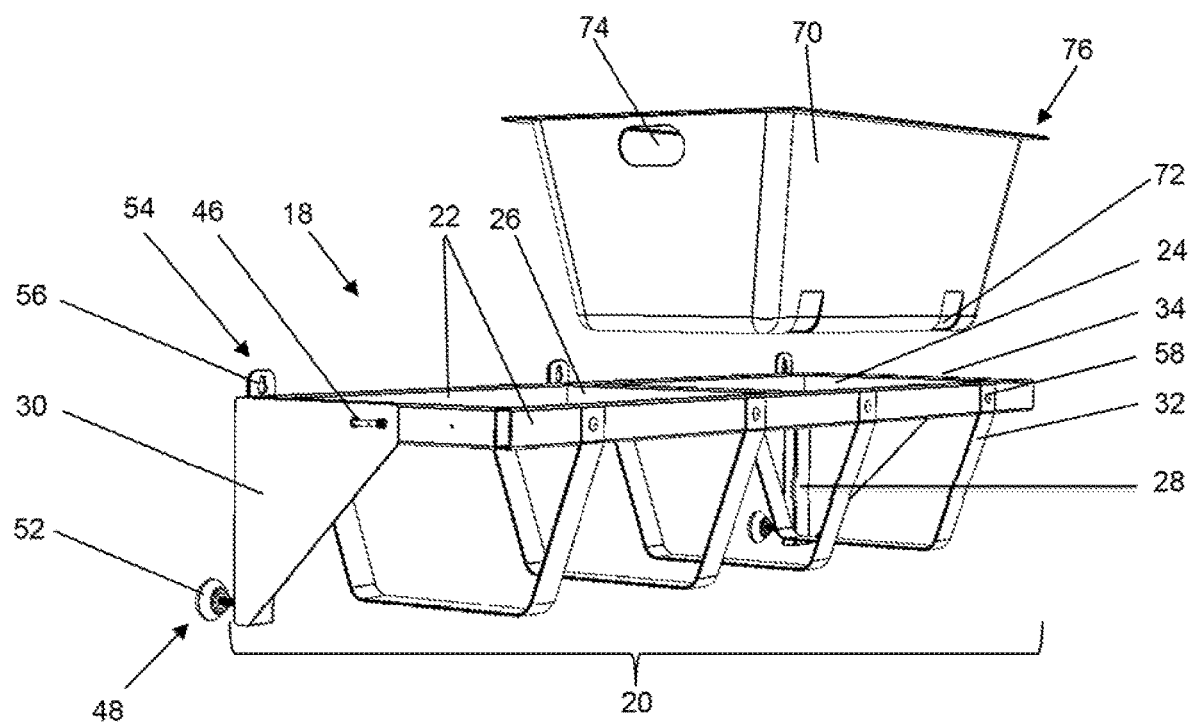
FIG. 3 is a perspective view of a storage caddy with a container being removed.

FIG. 3 illustrates a perspective view of a storage caddy 18 with a container 70 being removed from the frame assembly 20. The frame assembly 20 includes a pair of vertical frame members 28, a pair of longitudinal frame members 22, and a pair of lateral frame members 24. The lateral frame members 24 and the longitudinal frame members 22 are connected and form an open space that receives the container 70 so that the container 70 and its contents can be stored in the frame assembly 20. A cross member 26 is connected between the pair of longitudinal frame members 22 to increase rigidity. A pair of vertical frame members 28 holds the lateral frame members 24 and the longitudinal frame members perpendicular to the mounting surface. The support brackets 30 reinforce the lateral frame members 24 by forming a connection between the lateral frame members 24 and the vertical frame members 28. The support bracket 30 is equipped with an anchor 46 for the attachment of a tie-down 44. A leveling foot 48 is connected with the vertical frame members 28. The leveling feet 48 include a bumper 52 that contacts a wall of the cargo box (not shown). A plurality of mounting brackets 54 are secured to the longitudinal frame member 22 located at the rear of the frame assembly 20. The mounting brackets 54 include a hole 56 which allows a fastener 58 to lock the frame assembly 20 into position. Fasteners 58 are used to secure a plurality of support straps 32 between the longitudinal frame members 22 so that the support straps 32 support one or more containers 70. The containers include one or more channels 72 that receive the support straps 32 and assist in preventing movement of the support straps 32 and containers 70 relative to each other. The container 70 includes with a flange 76 which catches on the top surfaces 34 of the lateral frame members 24, longitudinal frame members 22, and cross members 26. The container 70 has a pair of handles 74 in opposite sides of the container 70.

Figure 4:
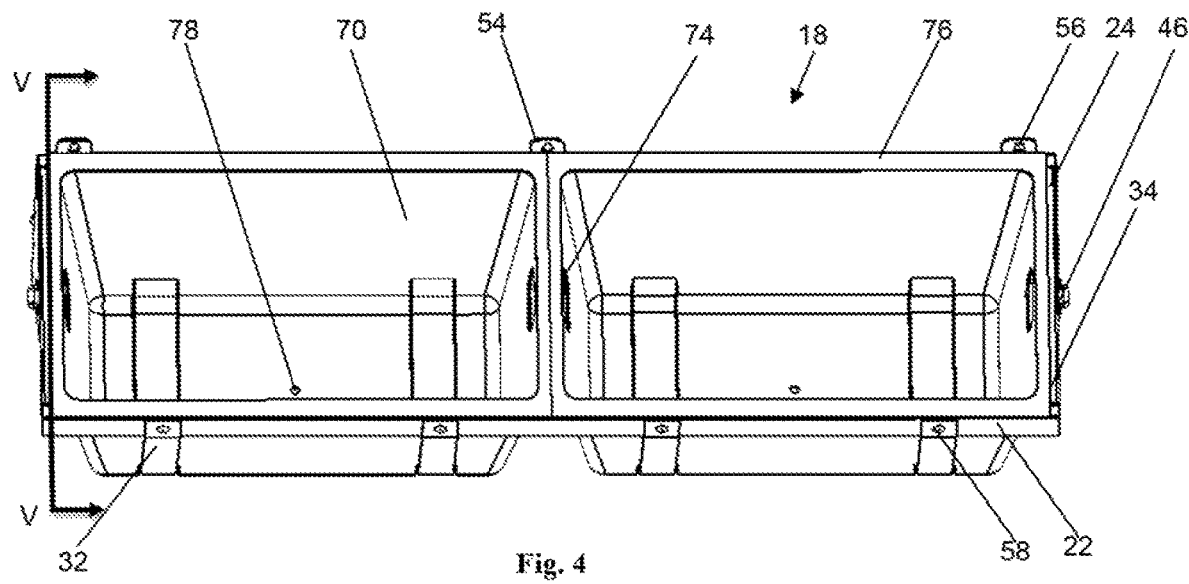
FIG. 4 is a top down view of a storage caddy.

FIG. 4 illustrates a top-down view of a storage caddy 18. The storage caddy 18 includes a container 70. The container 70 has a pair of handles 74 in opposite sides of the container 70 and an aperture 78 in the bottom that may act as a drain. Fasteners 58 are used to secure a plurality of support straps 32 between the longitudinal frame members 22. The container 70 is equipped with a flange 76 which catches on the top surfaces 34 of the lateral frame members 24, longitudinal frame members 22, and cross members 26. A plurality of mounting brackets 54 are secured to the back side of the rear longitudinal frame member 22. The mounting brackets 54 include a hole 56 which allows a fastener 58 to lock the frame assembly 20 into position. The storage caddy 18 is also equipped with an anchor 46 for the attachment of a tie-down 44 that provides additional stability to the storage caddy 18 by securing the storage caddy 18 to the cargo box (not shown).

Figure 5:
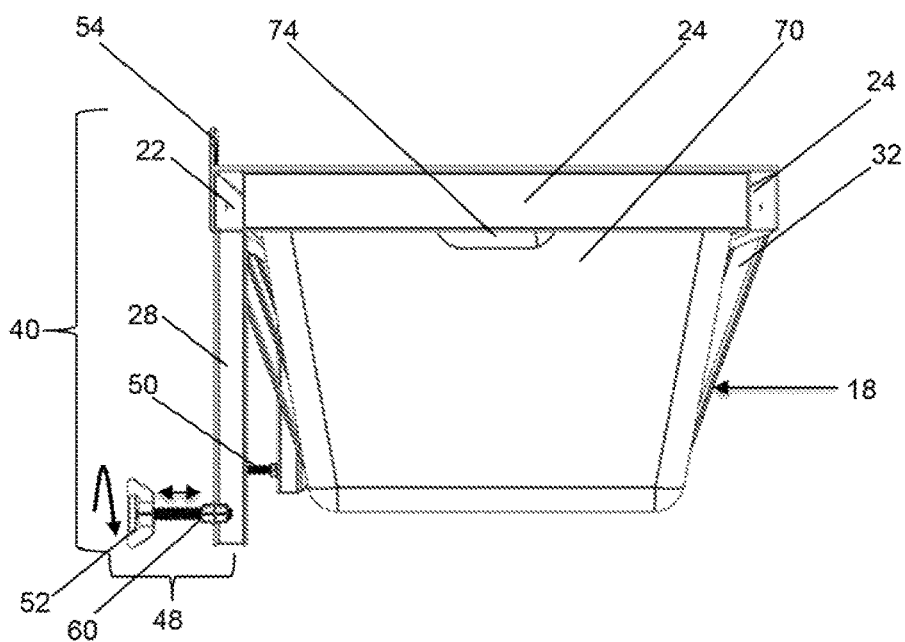
FIG. 5 is a cross-sectional side view of a storage caddy along lines V-V of FIG. 4.

FIG. 5 illustrates a side view of a storage caddy 18, which includes a mounting assembly 40. The mounting assembly 40 includes a plurality of mounting brackets 54, a pair of tie-downs (not shown), and two leveling feet 48. The leveling feet 48 are connected with the vertical frame members 28. Each leveling foot 48 includes a bumper 52, a rod 50, and a connector 60. The rod 50 may form a movable connection with the bumper 52 and/or the vertical frame member 28. A plurality of mounting brackets 54 are secured to the back side of the rear longitudinal frame member 22.

The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

The invention claimed is:

1. A storage caddy comprising:
    a. a frame assembly comprising a pair of frame members and a support strap connected to the pair of frame members;
    b. a mounting assembly connected to the frame assembly, the mounting assembly being configured to attach the storage caddy to one or more walls of a cargo box of a vehicle;
    c. one or more anchors connected to the frame assembly;
    d. one or more tie-downs extending from the one or more anchors and being configured to connect to one of the one or more walls, a floor, or both of the cargo box, and
    e. a container supported between the pair of frame members;
    wherein the support strap is configured to support a bottom of the container, wherein the container comprises a flange that rests on a top surface of one or both of the frame members.

2. The storage caddy of claim 1, wherein the bottom of the container, when the storage caddy is connected to the one or more walls, is elevated above the floor of the cargo box.

3. The storage caddy of claim 1, wherein the storage caddy includes one or more leveling feet.

4. The storage caddy of claim 1, wherein the cargo box has a top surface and the storage caddy, when connected to the cargo box, is entirely located below the top surface.

5. The storage caddy of claim 1, wherein the frame assembly includes two laterally opposing members.

6. The storage caddy of claim 5, wherein the two laterally opposing members are connected to the pair of frame members, the storage caddy comprises a second support strap that supports the bottom of the container, and the support strap and the second support strap are located between the two laterally opposing members.

7. The storage caddy of claim 1, wherein the support strap is flexible and hangs from the pair of frame members towards the floor of the cargo box when the frame assembly is connected to the one or more walls of the cargo box.

8. The storage caddy of claim 7, wherein the bottom of the container comprises a channel configured to receive the support strap.

9. The storage caddy of claim 1, wherein one or both of the frame members are substantially parallel to a forward wall of the cargo box.

10. The storage caddy of claim 1, wherein the support strap is flexible and hangs below the pair of frame members.

11. The storage caddy of claim 1, wherein the mounting assembly is configured to attach the frame assembly to a forward wall of the cargo box, and the one or more tie-downs are configured to connect the frame to a side wall of the cargo box.

12. The storage caddy of claim 1, wherein the container is removable from the frame assembly without disconnecting the one or more tie downs.

13. The storage caddy of claim 1, wherein the support strap comprises a cloth material.

14. The storage caddy of claim 1, wherein the storage caddy comprises a plurality of support straps, connected to and hanging from the pair of frame members, and
   wherein the storage caddy comprises a plurality of containers having bottoms supported by the plurality of support straps.

15. The storage caddy of claim 1, wherein the frame assembly comprises a vertical frame member, a lateral frame member, and a support bracket that connects together one of the pair of frame members, the lateral frame member, and the vertical frame member.

16. The storage caddy of claim 1, wherein the support strap hangs from the pair of frame members, and a portion of the support strap that supports the bottom of the container is below a bottom surface of the frame assembly.

* * * * *